United States Patent
Lau (10) Patent No.: US 10,625,518 B2
(45) Date of Patent: Apr. 21, 2020

(54) METHOD OF STITCHING OVERLAPPING PRINTHEAD SEGMENTS

(71) Applicant: MEMJET TECHNOLOGY LIMITED, Dublin (IE)

(72) Inventor: Daniel Lau, San Diego, CA (US)

(73) Assignee: Memjet Technology Limited (IE)

( * ) Notice: Subject to any disclaimer, the term of this patent is extended or adjusted under 35 U.S.C. 154(b) by 0 days.

(21) Appl. No.: 16/374,676

(22) Filed: Apr. 3, 2019

(65) Prior Publication Data

US 2019/0224988 A1    Jul. 25, 2019

Related U.S. Application Data

(63) Continuation of application No. 15/697,387, filed on Sep. 6, 2017, now Pat. No. 10,293,622.

(60) Provisional application No. 62/412,742, filed on Oct. 25, 2016.

(51) Int. Cl.
| | | |
|---|---|---|
| B41J 3/54 | (2006.01) | |
| B41J 2/21 | (2006.01) | |
| B41J 19/14 | (2006.01) | |
| G06K 15/10 | (2006.01) | |
| H04N 1/407 | (2006.01) | |
| H04N 1/56 | (2006.01) | |
| H04N 1/58 | (2006.01) | |
| G06T 3/00 | (2006.01) | |
| B41J 2/045 | (2006.01) | |
| B41J 2/07 | (2006.01) | |
| G06K 15/12 | (2006.01) | |

(52) U.S. Cl.
CPC ........... *B41J 3/543* (2013.01); *B41J 2/04518* (2013.01); *B41J 2/07* (2013.01); *B41J 2/2132* (2013.01); *B41J 2/2146* (2013.01); *B41J 19/145* (2013.01); *G06K 15/107* (2013.01); *G06K 15/1223* (2013.01); *G06T 3/0012* (2013.01); *H04N 1/4078* (2013.01); *H04N 1/56* (2013.01); *H04N 1/58* (2013.01)

(58) Field of Classification Search
CPC ........ B41J 19/145; B41J 2/04518; B41J 2/07; B41J 2/2132; B41J 2/2146; B41J 3/543; B41J 29/393; B41J 2/04508; B41J 2/04573; B41J 2/04586; G06K 15/1223; G06K 15/107; G06T 3/0012; H04N 1/4078; H04N 1/56; H04N 1/58
USPC ........................................ 347/12, 13, 29, 42
See application file for complete search history.

(56) References Cited

U.S. PATENT DOCUMENTS

| | | |
|---|---|---|
| 2004/0095420 A1 | 5/2004 | Ikemoto et al. |
| 2010/0007898 A1* | 1/2010 | Bane .................... G06K 15/107 358/1.4 |
| 2014/0320561 A1 | 10/2014 | Fischer et al. |

* cited by examiner

*Primary Examiner* — Jannelle M Lebron
(74) *Attorney, Agent, or Firm* — Cooley LLP (57) ABSTRACT

A method of printing an image using a printing system having first and second overlapping printhead segments. The method includes the steps of: (i) identifying a strip of the image to be printed in an overlap region of the first and second printhead segments; (ii) determining a stitching technique for the first and second printhead segments; and (iii) printing the image using the first and second printhead segments, the printing including stitching the first and second printhead segments in the overlap region using the determined stitching technique. The stitching technique may be a butt stitch or a feathered stitch, dependent on image content in the strip.

15 Claims, 7 Drawing Sheets

METHOD OF STITCHING OVERLAPPING PRINTHEAD SEGMENTS

CROSS-REFERENCE TO RELATED APPLICATION

This application is a continuation of U.S. application Ser. No. 15/697,387, filed Sep. 6, 2017, entitled METHOD OF MINIMIZING STITCHING ARTIFACTS FOR OVERLAPPING PRINTHEAD SEGMENTS, which claims the benefit of priority under 35 U.S.C. § 119(e) of U.S. Provisional Application No. 62/412,742, filed Oct. 25, 2016, entitled METHOD OF MINIMIZING STITCHING ARTIFACTS FOR OVERLAPPING PRINTHEAD SEGMENTS, the disclosure of each of which is hereby incorporated by reference in its entirety for all purposes.

FIELD OF THE INVENTION

The present invention relates generally to printing systems having overlapping printhead segments. It has been developed primarily for minimizing stitching artifacts in overlap regions.

BACKGROUND

Pagewide printing dramatically increases print speeds compared to traditional scanning printheads. Many types of pagewide printers use overlapping printhead segments to form a pagewide array configured for printing over a required media width. For example, the Applicant's wide-format pagewide printers described in WO2011/011824 use a staggered overlapping array of multi-color A4-sized printheads, which extend across wideformat media. The Applicant's modular printing systems described in U.S. Provisional Application No. 62/330,779 filed 2 May 2016 use multiple monochrome pagewide print bars, each print bar having a staggered overlapping array of monochrome printheads ("print modules"). Other pagewide printers, such as those described in U.S. Pat. No. 8,662,636 use a staggered overlapping array of printhead chips to form a pagewide printhead. In the present context, the term "printhead segment" encompasses both printhead chips and printheads (or print modules) comprised of multiple printhead chips.

A problem with overlapping printhead segments is that pairs of neighbouring printhead segments must be stitched together in their overlap regions. As used herein, the term "stitching" refers to any method by which image content is printed from a pair of overlapping printhead segments. Whatever stitching method is used, print artifacts generally result from the stitching, either in the form of a light or dark streak down the page.

In its simplest form, butt joins may be used for stitching, whereby one printhead segment prints image content on one side of a fixed stitch point and a neighbouring overlapping printhead segment prints image content on the other side of the fixed stitch point. Test prints may be used to select the position of the fixed stitch point in the overlap region and thereby provide the least objectionable print artifacts.

More sophisticated methods for hiding stitch points have also been described in the art. For example, EP-A-0034060 describes a method of varying the position of the stitch point for overlapping printhead segments. In different lines of print, the stitch point may be varied in a random or cyclic manner in order to hide stitching artifacts.

U.S. Pat. No. 7,331,646 describes a stitching method whereby printing is shared between the overlapping printhead segments in the overlap region. Typically, printing is faded from one printhead to the other across the overlap region, in accordance with a dedicated overlap dither. This type of is stitching is sometimes referred to in the art as "feathering".

The prior art has generally focused on various types of overlap dither in an attempt to improve stitching and minimize print artifacts. However, a problem with all stitching techniques is that the relative positioning of the overlapping printhead segments is never precisely known and, moreover, cannot be controlled to the necessary degree of accuracy during printhead manufacture or printhead replacement. A further problem is that two dots printed on top of each other typically produce a higher optical density than simply printing the same two dots separately. Therefore, producing a predictable optical density in the overlap region is virtually impossible, because overlapping dithers from overlapping printheads will produce an unpredictable number of dot-on-dot artifacts depending on the precise registration of the printheads. Hence, overlap dithers tend to produce a dark streak down the page when dot-on-dot printing occurs in the overlap region. Surprisingly, unsophisticated butt joins often produce the best results for many types of image content due to the above-mentioned problems with more sophisticated dithering methods. Nevertheless, butt joins are far from satisfactory when printhead segments are misaligned and/or somewhat rotated relative to each other.

With the commercial growth of pagewide printers having overlapping printheads and/or printhead chips, and particularly in view of customers' sensitivity to print quality in many market segments, it would be desirable to improve methods of stitching so as to reduce noticeable stitching artifacts and improve overall print quality.

SUMMARY OF INVENTION

In a first aspect, there is provided a method of printing an image using a printing system comprising at least first and second overlapping printhead segments, the method comprising the steps of:

(i) identifying a strip of the image to be printed in an overlap region of the first and second printhead segments;

(ii) determining a continuous seam in the strip based on a cost function, the cost function including at least one parameter selected from the group consisting of: (a) minimizing a density of printed ink along the seam; and (b) maximizing a luminance along the seam; and (iii) printing the image using the first and second printhead segments, the printing comprising stitching the first and second printhead segments across the seam, wherein the strip contains variable image content and the seam has a varying position within the strip.

The method according to the first aspect advantageously minimizes stitching artifacts in printouts, as will be described in more detail below.

Preferably, the strip contains regions of relatively higher ink density and regions of relatively lower ink density, and wherein the seam is a continuous path passing through at least some of the regions of relatively lower ink density.

Preferably, the seam is determined from a row-by-row analysis of the image content contained in the strip, each row having a stitch point determined by the cost function.

Preferably, the cost function includes a parameter defining a maximum threshold distance between contiguous stitch points in the strip.

Preferably, the cost function includes a parameter weighting the seam towards edges in the image content.

Preferably, the seam is determined using a seam carving algorithm.

Preferably, the first and second printhead segments are stitched across the seam using a stitching technique selected from at least one of:

(a) printing using only nozzles from the first printhead segment at one side of the seam and printing using only nozzles from the second printhead segment at the other side of the seam; and (b) printing using nozzles from both the first and second printhead segments across the overlap region.

In some embodiments, the stitching technique is dependent on the image content in the strip.

In some embodiments, the method includes the step of separating image content in the strip into a foreground image and a background image, wherein stitching technique (a) is used for the foreground image and stitching technique (b) is used for the background image.

Preferably, stitching technique (b) employs a fade transition from the first printhead segment to the second printhead segment across the overlap region. Typically, the stitching technique (b) employs a dedicated overlap dither across the seam. The type of overlap dither employed may be dependent on the image content contained in the strip.

The first and second printhead segments may be individual printhead chips of a printhead. Alternatively or additionally, the first and second printhead segments are individual printheads, such as overlapping printheads (or print modules) of a pagewide print bar. Each printhead typically comprises a plurality of printhead chips, which may be butted in single row or positioned in a staggered overlapping array.

Preferably, the first and second printhead segments print the image using uncorrelated dithers.

Typically, the printer comprises one or more sets of n overlapping printhead segments, each set having n−1 overlap regions, wherein n is an integer from 2 to 50.

Preferably, the overlap region has a width in the range of 1 to 20 mm. Wider overlap regions are generally preferred to enable determination of a seam invoking minimal stitching artifacts.

Preferably, the seam is determined from analysis of a raster graphics image, a vector graphics image or a bitmap image representing image content in the overlap region. Typically, the seam is determined prior to halftoning and separation of the image into monochrome color channels (e.g. CMYK channels) for printing. However, determination of the seam after halftoning is, of course, within the ambit of the present invention.

In some embodiments, the seam may be contained in a seam envelope having a width which is less than a width of the overlap region.

In a further aspect, there is provided a method of printing an image using a printer comprising at least first and second overlapping printhead segments having an overlap region, the method comprising the step of printing the image by stitching the first and second printheads across a seam, wherein the seam follows a varying continuous path within a strip of the image corresponding to the overlap region of the first and second printhead segments, the strip containing variable image content having regions of relatively higher ink density and regions of relatively lower ink density, and wherein the continuous path passes through at least some of the regions of relatively lower ink density.

In a further aspect, there is provided a method of processing an image for printing using a printer having at least first and second overlapping printhead segments, the method comprising the steps of:

(i) identifying a strip of the image to be printed in an overlap region of the first and second printhead segments;

(ii) determining a continuous seam in the strip based on a cost function, the cost function including at least one parameter selected from the group consisting of: (a) minimizing a density of printed ink along the seam; and (b) maximizing a luminance along the seam; and (iii) stitching print data for the first and second printhead segments across the seam, wherein the strip contains variable image content and the seam has a varying position within the strip.

In a further aspect, there is provided a printing system for printing an image, the printing system comprising:

(A) a printer comprising at least first and second overlapping printhead segments; and (B) an image processor configured for performed the steps of:

(i) identifying a strip of the image to be printed in an overlap region of the first and second printhead segments;

(ii) determining a continuous seam in the strip based on a cost function, the cost function including at least one parameter selected from the group consisting of: (a) minimizing a density of printed ink along the seam; and (b) maximizing a luminance along the seam; and (iii) stitching print data for the first and second printhead segments across the seam, wherein the strip contains variable image content and the seam has a varying position within the strip.

In a second aspect, there is provided a method of printing an image using a printing system comprising at least first and second overlapping printhead segments, the method comprising the steps of:

(i) identifying a strip of the image to be printed in an overlap region of the first and second printhead segments;

(ii) identifying a foreground image and a background image for image content contained in the strip;

(iii) determining a seam in the foreground image;

(iv) printing the foreground image using only nozzles from the first printhead segment at one side of the seam and only nozzles from the second printhead segment at the other side of the seam; and (v) printing the background image using nozzles from both the first and second printhead segments across the overlap region.

The method according to the second aspect advantageously minimizes stitching artifacts in printed images containing foreground and background images, as will be described in further detail below.

Preferably, the foreground image comprises one or more of: text and line work.

Preferably, the background image comprises contone graphics.

In one embodiment, the foreground image is separated from the background image using a threshold image intensity in a raster graphics image. In an another embodiment, the foreground image is based on a vector graphics image.

Preferably, the seam is selected from: (a) a linear seam having a fixed position within the strip; and (b) a continuous seam having a varying position within the strip Preferably, the seam is determined from a row-by-row analysis of the image content contained in the strip, each row having a stitch point determined by a cost function. The cost function may include at least one parameter selected from the group consisting of: (a) minimizing a density of printed ink along the seam; and (b) maximizing a luminance along the seam. The cost function may additionally includes a parameter defining a maximum threshold distance between contiguous stitch points in the strip and/or a parameter weighting the seam towards edges in the image content.

Preferably, the background image is printed using a fade transition from the first printhead segment to the second printhead segment.

In a further aspect, there is provided a method of printing an image using a printer comprising at least first and second overlapping printhead segments having an overlap region, the image comprising a foreground image and a background image, the method comprising the steps of:

(i) printing the foreground image using only nozzles from the first printhead segment at one side of a seam and only nozzles from the second printhead segment at the other side of a seam; and (ii) printing the background image using nozzles from both the first and second printhead segments across the overlap region.

In a further aspect, there is provided a method of processing an image for printing from a printer having at least first and second overlapping printhead segments, the method comprising the steps of:

(i) identifying a strip of the image to be printed in an overlap region of the first and second printhead segments;

(ii) identifying a foreground image and a background image for image content contained in the strip;

(iii) determining a seam in the strip;

(iv) printing the foreground image using only nozzles from the first printhead segment at one side of the seam and only nozzles from the second printhead segment at the other side of the seam; and (v) printing the background image using nozzles from both the first and second printhead segments across the overlap region.

In a further aspect, there is provided a printing system for printing an image, the printing system comprising:

(A) a printer comprising at least first and second overlapping printhead segments; and (B) an image processor configured for performed the steps of:

(i) identifying a strip of the image to be printed in an overlap region of the first and second printhead segments;

(ii) identifying a foreground image and a background image for image content contained in the strip;

(iii) determining a seam in the strip;

(iv) printing the foreground image using only nozzles from the first printhead segment at one side of the seam and only nozzles from the second printhead segment at the other side of the seam; and (v) printing the background image using nozzles from both the first and second printhead segments across the overlap region.

As used herein, the term "luminance" is used to mean the intensity of light emitted from a surface. Nominally, black has 0% luminance and white has 100% luminance.

As used herein, the term "seam" refers to a set of contiguous stitch points, each stitch point having a predetermined position for each row of print. A set of fixed stitch points produces a linear seam; whereas a set of variable contiguous stitch points produces a continuous seam having a wandering path.

BRIEF DESCRIPTION OF THE DRAWINGS

One or more embodiments of the present invention will now be described with reference to the drawings, in which.

DETAILED DESCRIPTION

Figure 1:
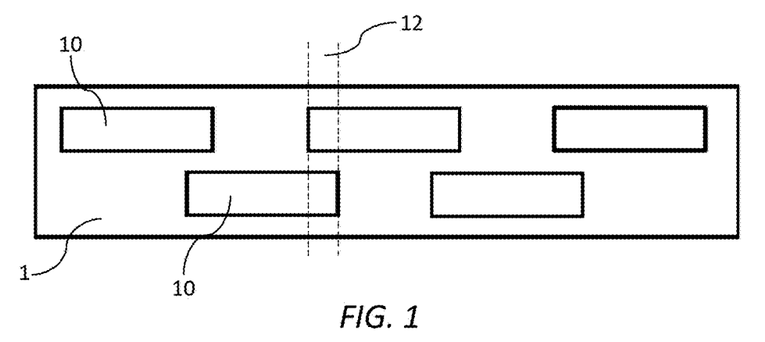
FIG. 1 shows schematically a print bar having five overlapping printheads.

Referring to FIG. 1, there is shown schematically a print bar 1 comprising a fixed array of five overlapping printhead segments. Each printhead segment takes the form of an elongate inkjet printhead 10 (e.g. A4-sized printhead) having rows of nozzles (not shown) for ejection of ink. In FIG. 1, the five printheads are nominally designated Printhead 1, Printhead 2, Printhead 3 etc from left to right. In the print bar 1 shown in FIG. 1, the printheads 10 are all monochrome printheads, although it will be appreciated that multi-color printheads are, of course, with the ambit of the present disclosure.

Neighbouring overlapping printheads 10 have an overlap region 12 whereby nozzles from either of the overlapping printheads may be used to print a strip of an image corresponding to the overlap region. In these overlap regions 12, the neighbouring printheads 10 must be stitched together to avoid discontinuities in the printed image.

One prior art stitching method (known in the art as "butt joins") simply sets a fixed stitch point in the overlap region 12 and allocates printing to printheads at either side of the fixed stitch point. Butt joins often produce adequate results for plain text, but typically produce relatively poor results for contone images.

Figure 2:
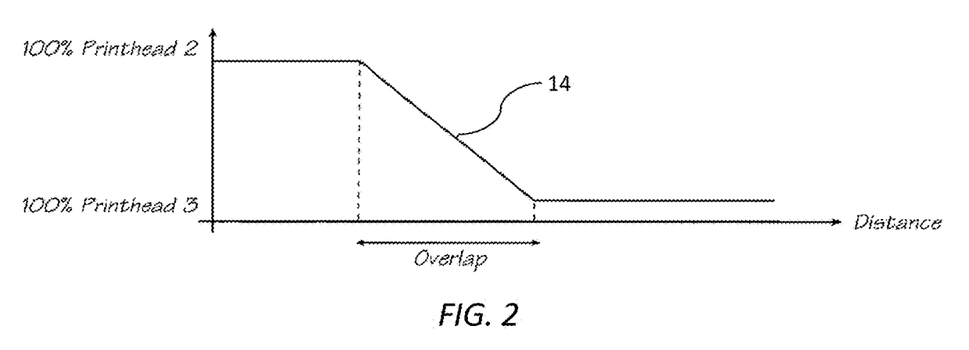
FIG. 2 shows a method of fading print output from one printhead to another.

FIG. 2 illustrates another prior art stitching method for printing in the overlap region 12. In this stitching method, printing is shared between Printhead 2 and Printhead 3 across the overlap region 12 by means of a suitable overlap dither. In its simplest form, the overlap dither linearly fades ("feathers") printing across the overlap region from Printhead 2 to Printhead 3. At a nominal stitch point 14 halfway across the overlap region 12, Printhead 2 and Printhead 3 share printing roughly equally. Although FIG. 2 shows a linear transition across the overlap region, it will appreciated that non-linear transitions, different fade gradients etc. may also be used.

As foreshadowed above, such stitching methods do not always provide acceptable print quality. Without wishing to be bound by theory, it is understood by the present inventor that unpredictable dot-on-dot printing in the overlap region 12 caused by slight misalignments of the printheads 10 is, to a large extent, responsible for the poor outputs observed from conventional stitching methods.

The stitching method described above in connection with FIG. 2 may be improved empirically. For example, if stitching artifacts are particularly visible from a test print, in the form of either a light of dark streak down a page, this information may be fed back to a controller and the overlap dither adjusted appropriately. For example, the controller may adjust the overlap dither so as to reduce or increase the dot density in the overlap region, as appropriate.

Information on print quality of test prints may be collected either using a downstream scanner detecting print artifacts or, more usually, from a subjective analysis of test prints by the user. However, this type of empirical feedback to adjust overlap dithers is generally unsatisfactory. Different image content will typically require a different optimization of the overlap dither, and dither optimization on an empirical basis is time-consuming and impractical for individual print jobs. Even with optimization of the overlap dither, streaks may still be visible due to unpredictable interference effects resulting from the image content, the overlap dither and the relative positions of the printhead segments. For example, Moire interference effects typically produce highly visible streaks when one printhead 10 is slightly rotated relative to its neighbouring printhead. These intrinsic interference effects cannot usually be eliminated simply by adjusting the dot density in the overlap dither.

What is required is a technique for stitching overlapping printhead segments together, which is robust enough to deal with misaligned printhead segments, does not rely on empirical feedback from test prints and is optimized for any printed image.

Surprisingly, the present inventor has found that a technique used for digitally re-sizing images, known in the art as "seam-carving", can be modified to produce excellent results in stitching overlapping printhead segments together. The technique of seam-carving is described in detail in Shai Avidan, Ariel Shamir, Seam carving for content-aware image resizing, ACM Transactions on Graphics (TOG), v.26 n.3, July 2007, the contents of which are incorporated herein by reference. Briefly, the seam-carving technique generates a continuous path of pixels (a "seam") across an image, from top to bottom or left to right, based on a cost function, such as an image energy function. Thus, the resizing of the image is content-aware rather than simply cropping the image to size. For example, in order to change the aspect ratio of an image, the seam-carving technique identifies continuous seams of relatively unnoticeable pixels which blend with their surroundings. These so-called low energy seams may be either carved out or duplicated in the original image to change its aspect ratio, whilst preserving the more visually important components of the image. The person skilled in the art of image processing will be readily aware of various algorithms used in seam-carving.

In the methods described herein, seam-carving is used to determine a set of stitch points in a continuous seam within a strip of an image printed by the overlap region 12. The position of a particular stitch point for a respective row of print is based on a first requirement of minimizing a density of printed ink and/or maximizing luminance. However, in order to avoid the stitch point jumping across each side of the overlap region 12 for contiguous rows of print, a second requirement is that the successive stitch points should be contiguous so as to form a continuous seam or path along the strip.

Figure 3:
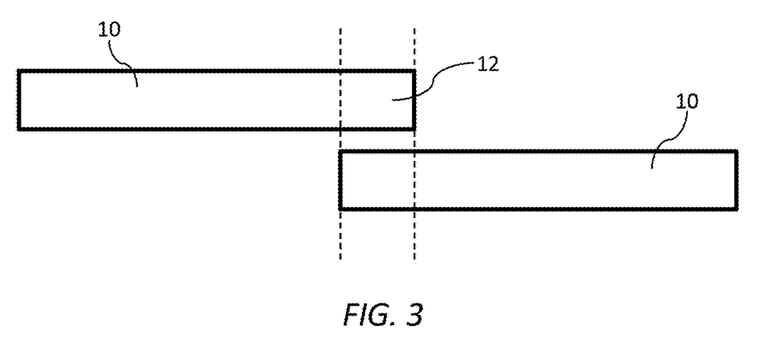
FIG. 3 shows schematically a printer having two overlapping printheads with an overlap region.
Figure 4:
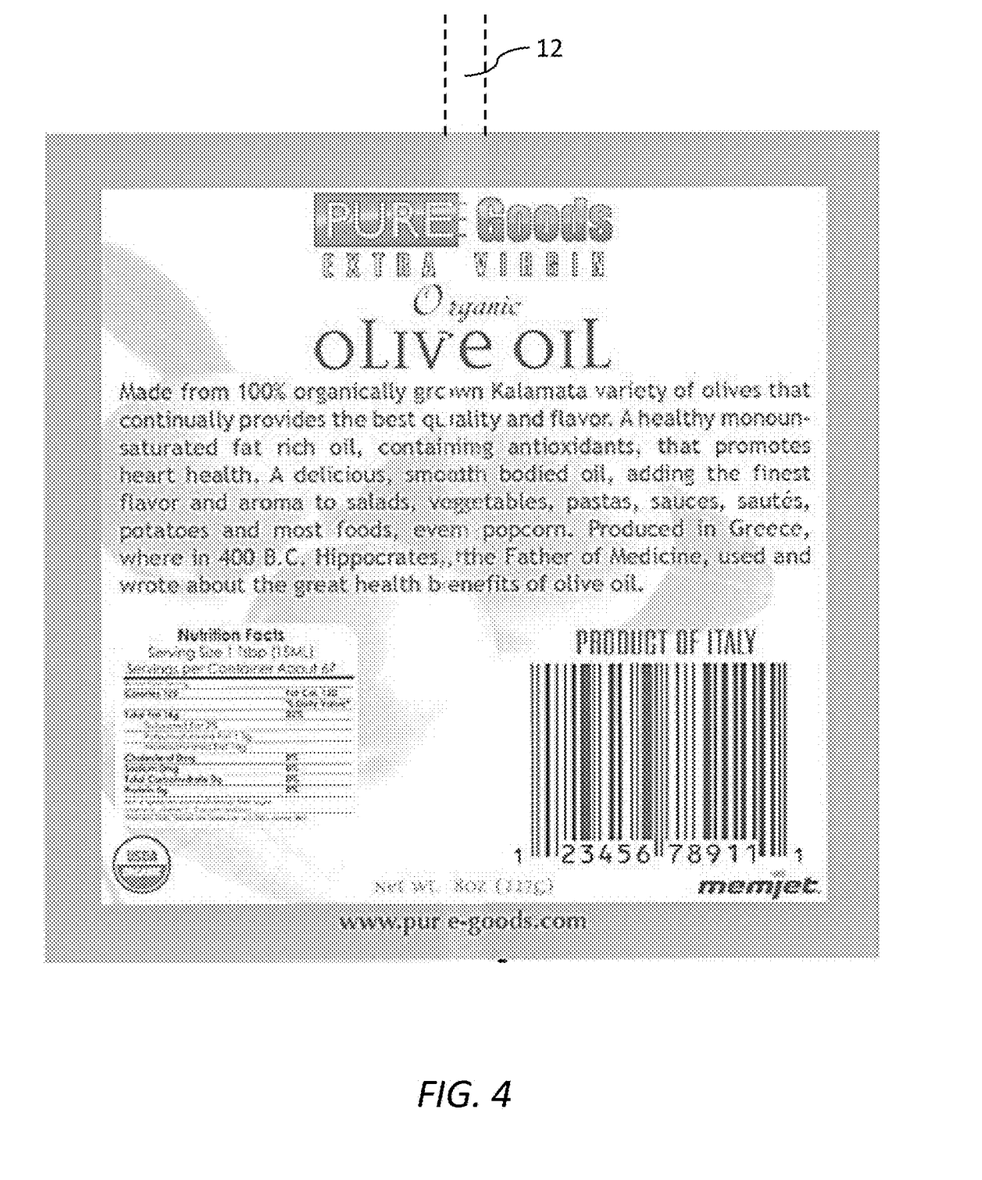
FIG. 4 shows a printout from the printer shown in FIG. 3 using a non-optimized method for determining stitch points.

The first requirement advantageously minimizes a probability of dot-on-dot printing in the overlap region by making stitch points content-dependent. However, if successive stitch points are allowed to jump across the overlap region, then visible print artifacts can still occur by virtue of the neighbouring printheads alternately printing high density portions of the image. FIG. 4 shows a sample printout from a print bar having two overlapping printheads 10 (shown schematically in FIG. 3) using a technique of selecting stitch points based solely on a minimum ink density and allowing successive stitch points to jump without limitation. Stitching of the overlapping printheads is via a butt join, whereby image content at the lefthand side of each stitch point is allocated to the lefthand printhead, and image content at the righthand side of each stitch point is allocated to the righthand printhead The result is a poor quality output, which is particularly visible in text regions. For example, in the letter "v" of the large-type word "oLive", stitching artifacts are caused by switching successive stitch points from the right side of the letter to the left side and back again. Therefore, although the selection of stitch points based on a minimum ink density in the image might appear to be a viable method of hiding stitching artifacts, the results shown in FIG. 4 are clearly less than satisfactory.

Figure 5:
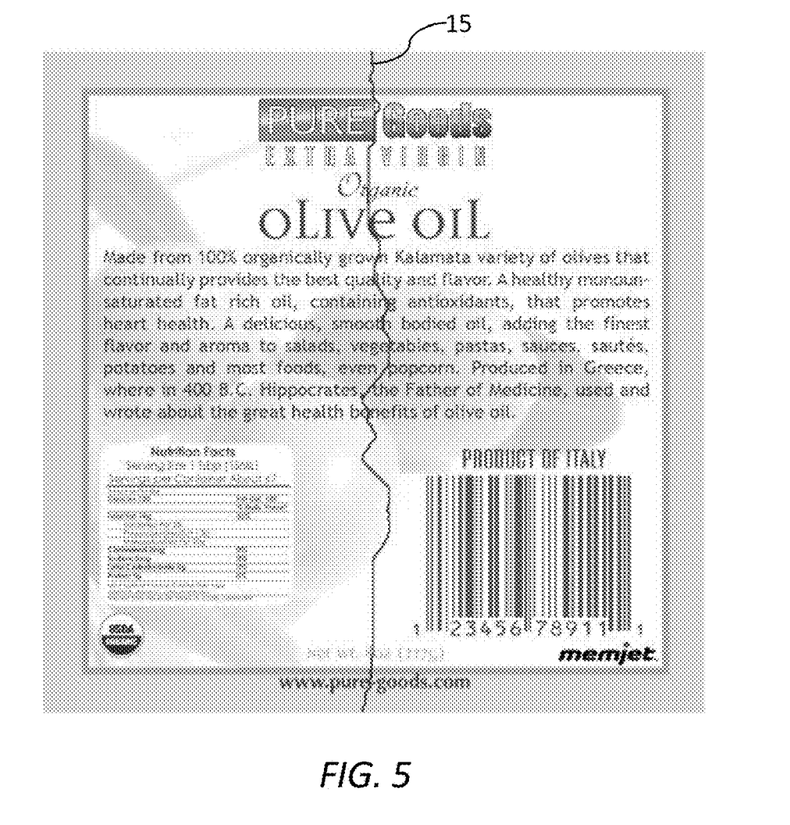
FIG. 5 shows a printout from the printer shown in FIG. 3 using a seam-carving method for determining stitch points.
Figure 6:
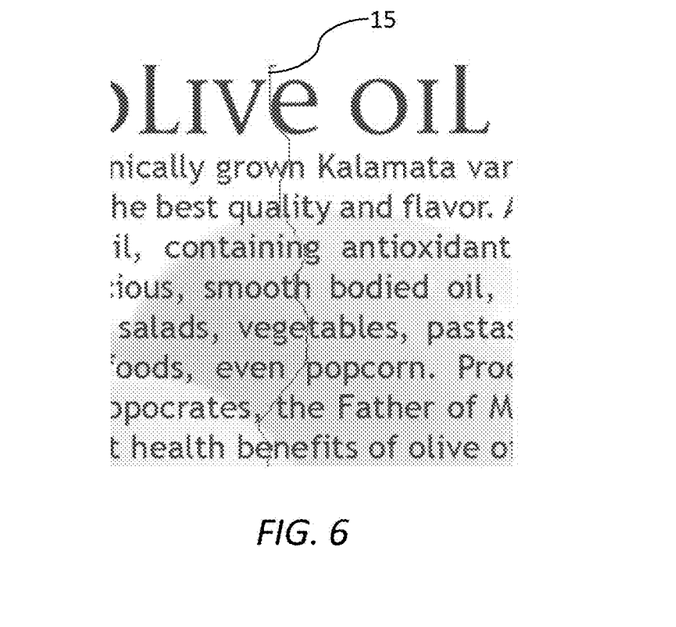
FIG. 6 shows a magnified portion of the printout shown in FIG. 5.

In FIG. 5, a seam carving algorithm is employed, which imposes the additional requirement of a continuous seam down the strip printed by the overlap region 12. Here, the results are remarkably improved over those shown in FIG. 4. The seam carving algorithm defines a continuous seam 15, comprised of a plurality of contiguous stitch points, which meanders in a path between and around individual text characters (see FIG. 6). In this way, printing of high density regions (e.g. text characters) cannot be alternated between the two printheads, but is instead allocated to one printhead or the other. Hence, the stitching artifacts which are clearly visible in FIG. 4 have virtually been eliminated and, moreover, the individual stitch points generally remain in relatively low density regions so as to minimize the probability of dot-on-dot printing across the stitch points. Of course, the seam 15 has been shown in FIGS. 5 and 6 for illustrative purposes only and is not part of the actual printout.

In order to produce the continuous seam 15 shown in FIG. 5, a two pass procedure was employed that processes an input image for the overlap region row-by-row. In any particular pass, the input image pixel x[r, c], with row r and column c, is converted to an output pixel y[r, c] according to:

$$y[r, c] = x[r, c] + \min\{y[r-1, c-1], y[r-1, c], y[r-1, c+1]\}$$

where y[r−1, c−1] is the output pixel from the previously processed row and one pixel to the left of the current pixel, y[r−1, c] is the output pixel from the previously processed row directly above the current pixel, and y[r−1, c+1] is the output pixel from the previously processed row and one pixel to the right of the current pixel.

Working from top to bottom, the output pixel y[r, c] in the last row corresponds to a continuous path through the image that cuts through the image. So starting with this pixel as the seam or path through the image, the pixel selected from y[r−1, c−1], y[r−1, c] or y[r−1, c+1] having the minimum value is added to the seam. The seam is then extended iteratively by adding pixels using the same criteria until the top of the image has been reached and there is a complete, continuous seam through the image.

Although one simple seam carving algorithm has been described above, it will be appreciated that the seam carving algorithm may be modified, as appropriate. For example, a number of different seams may be generated and an optimal seam selected based on one or more additional parameters. For example, it may be desirable to select the seam having the lowest average ink density for some types of image content. For other image content, it may be desirable to select the seam having the lowest of number of contiguous stitch points with a high ink density. Typically, less visible stitching is achieved when the seam follow edges in the image content. Therefore, the seam-carving algorithm may include a parameter weighting the seam towards edges (e.g. edges of text, boxes, lines etc). These and other criteria for selecting the optimum seam will be readily apparent to the person skilled in the art.

In the seam carving algorithm described above, the maximum allowable horizontal distance between contiguous stitch points is set at one pixel of the digital image. This ensures a smooth continuous path of the seam. However, the maximum distance between contiguous stitch points may alternatively be defined in terms of printed dot positions, which may be different than digital pixel positions depending on when seam carving is performed in the image processing pipeline. Further, the maximum distance between contiguous stitch points may be varied depending on image content, print speed, print resolution etc. provided that the seam is continuous. For example, the seam carving algorithm may allow a distance of 1, 2, 3, 4 or 5 horizontal pixel or dot positions between contiguous stitch points. Typically, seam carving is performed on a digital bitmap image at a same resolution as the printed image; hence digital pixel positions correspond with printed dot positions.

From the foregoing, it will be appreciated that the seam carving algorithm may be weighted by any suitable cost function in order to optimize stitching for a particular print job.

Seam carving is typically performed on a raster graphics image prior. The raster graphics image may be represented in any suitable color space, such as CMYK, RGB or Lab color space. If seam carving is based on minimizing a printed ink density, then CMYK and RGB color spaces may be used to represent the image. However, optimal seam carving results may be achieved by maximizing luminance along the seam, in which case seam carving of an image represented in Lab color space is more appropriate. Maximizing luminance typically produces superior results, because the human eye is more sensitive to, for example, magenta than yellow. In other words, the seam carving algorithm may weight the seam towards yellow regions of the image, even if those regions have a relatively high ink density, because those regions are less visible to the human eye. In one embodiment, the image may be converted from RGB or CMYK color space into Lab space for seam carving, and then converted back into CMYK color space for further image processing after the seam has been defined.

Alternatively, seam carving may be performed separately on monochrome halftone images and applied to each color channel of the printer separately. For example, the printer may comprise a plurality of aligned monochrome print bars (e.g. CMYK). For each halftone bitmap image, the seam carving algorithm may be used to determine a seam for each overlapping pair of printheads in each monochrome print bar. Hence, different print bars may use different seams for corresponding overlap regions depending on the image content. In this instance, the parameters of minimizing ink density and maximizing luminance will be one of the same.

Having determined a path of the seam through an image using a suitable seam carving algorithm, the method of stitching the overlapping printhead segments across the seam is not particularly limited. For example, butt joins may be used to stitch across the seam, whereby one printhead is allocated to print all image content to the left of the seam and another printhead is allocated to print all image content to the right of the seam. Butt joins may be appropriate for printing images having distinct light and dark regions (e.g. plain text, line art etc) in the overlap region.

For printing contone images, more sophisticated stitching techniques may be appropriate. For example, an overlap dither may be used to fade printing from one printhead to an overlapping neighbouring printhead. Each stitch point typically defines a midway point of the overlap dither with an equal number of nozzles at either side of the stitch point fading from one side to the other. In some embodiments, combinations of butt joins and overlap dithers may be used, depending on the image content. Likewise, different color channels may use different stitching techniques depending on the image content. In some embodiments, overlap dithers may be optimized using empirical feedback from test-printouts of the image.

It will be appreciated that, although the seam carving method may be applied to any width of overlap region, relatively wider overlap regions are generally preferred so as to provide a higher probability of defining a seam having the least stitching artifacts. Where overlap dithers are used to fade from one printhead to another, it may be preferable for the width of an envelope containing the seam to be limited to less than the width of the overlap region 12. Accordingly, some nozzles at the extremities of the overlap region 12 may be reserved to allow an overlap dither across each stitch point.

Figure 7:
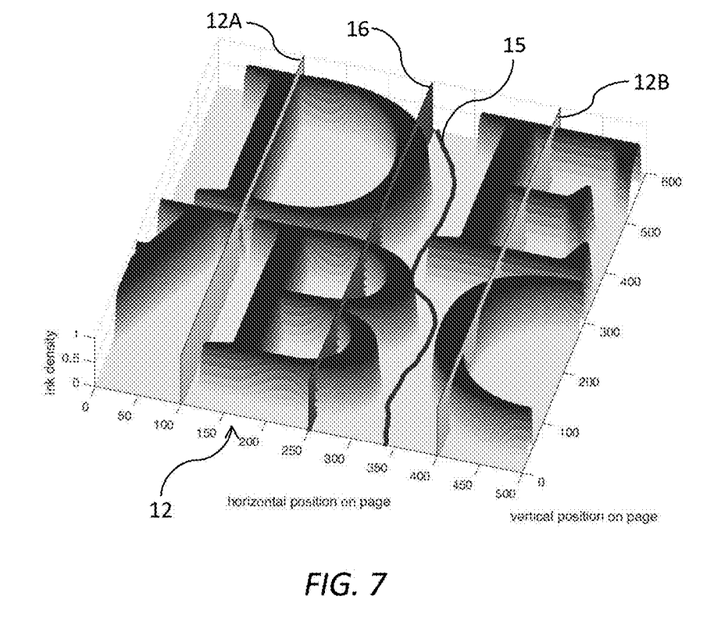
FIG. 7 is an ink density map for a portion of text image in an overlap region of lefthand and righthand printheads.
Figure 8:
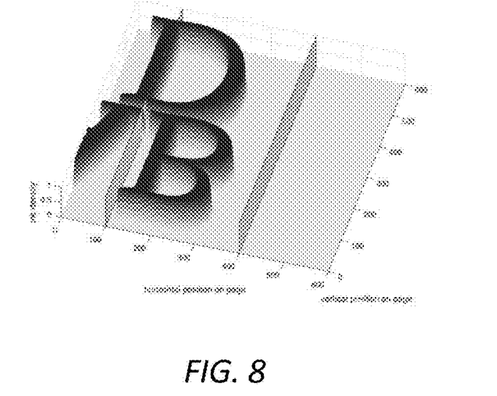
FIG. 8 is an ink density map for image content allocated to the lefthand printhead after seam carving of the text image shown in FIG. 7.
Figure 9:
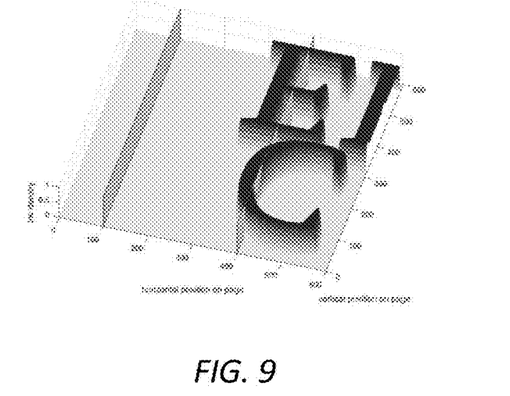
FIG. 9 is an ink density map for image content allocated to the righthand printhead after seam carving the text image shown in FIG. 7.

FIGS. 7 to 9 show how image processing may be performed for plain text on a white background, in accordance with a first embodiment. In FIG. 7, the image content in the overlap region 12 is represented as an ink density map. The ink density is zero in white regions and steeply rises to a maximum in the regions containing text. The planes 12A and 12B represent the lefthand and righthand limits of the overlap region 12, while the plane 16 is a nominal midpoint of the overlap region. The plane 16 represents a typical prior art fixed seam for stitching overlapping printheads.

Still referring to FIG. 7, the continuous seam 15 snakes between the regions of high ink density ink, in accordance with the seam carving algorithm described above. The seam 15 is analogous to a river bed wandering through a lowest point of a valley having mountains at either side.

As shown in FIGS. 8 and 9, the two overlapping printheads are stitched across the seam 15 using a simple butt join. In other words, the lefthand printhead is allocated the image show in FIG. 8, while the righthand printhead is allocated the image shown in FIG. 9.

FIGS. 10 to 18 show how image processing may be performed for plain text on a contone background image, in accordance with a second embodiment. In this example, the contone background image is a simple plain gray background at about 35% ink density with a maximum ink density in regions containing text. However, the contone background image may be, for example, a photo or other contone image. It will therefore be appreciated that the method according to the second embodiment may be suitable for printing, for example, labels, brochures etc. containing text on contone graphics.

Figure 10:
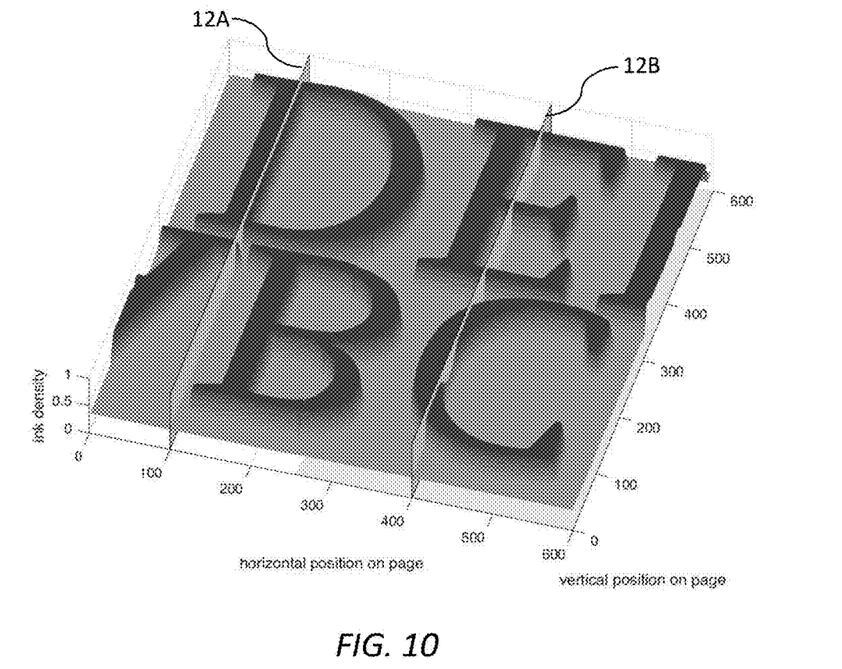
FIG. 10 is an ink density map for a portion of foreground text image on a contone background image in an overlap region of lefthand and righthand printheads.
Figure 11:
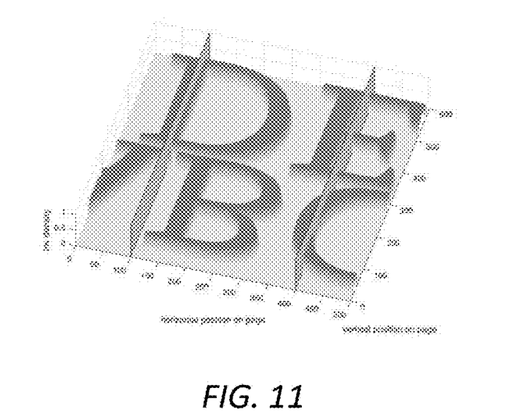
FIG. 11 is an ink density map for the foreground text image of FIG. 10.
Figure 12:
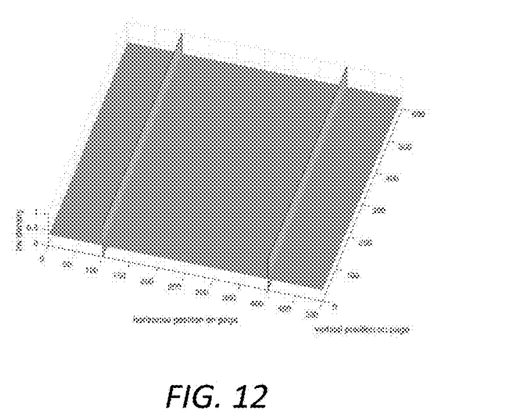
FIG. 12 is an ink density map for the background contone image of FIG. 10.
Figure 13:
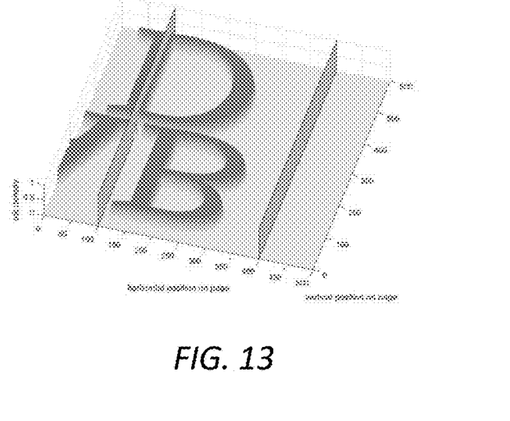
FIG. 13 is an ink density map for foreground image content allocated to the lefthand printhead after seam carving the foreground text image shown in FIG. 11.
Figure 14:
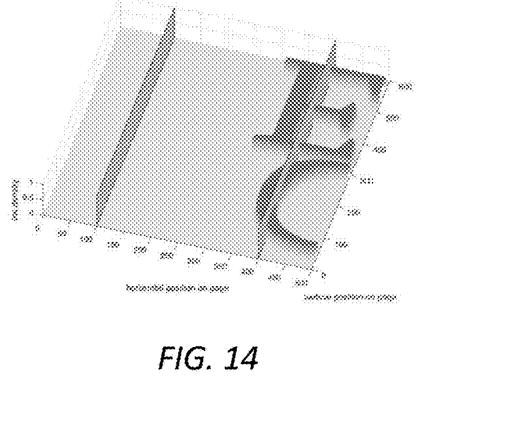
FIG. 14 is an ink density map for foreground image content allocated to the righthand printhead after seam carving the foreground text image shown in FIG. 11.

In a first step, the image content shown in FIG. 10 is separated into a foreground image (FIG. 11) and a background image (FIG. 12). Separation of the foreground and background images may be performed using any suitable method known in the art. Where, for example, the image in FIG. 10 is a raster graphics image, the foreground image may be separated by, for example, selecting all image content above a predetermined ink density threshold (or below a predetermined luminance threshold). Where, for example, the text in FIG. 10 is based on vector graphics (e.g. Postscript™), then the foreground image may be easily determined. Other more sophisticated methods of separating foreground and background images will be known to those skilled in the art.

Having identified the foreground image containing text, the foreground image is processed in the same way as described in connection with FIGS. 7 to 9. Accordingly, the seam 15 is defined using the seam carving algorithm and the lefthand printhead is allocated the foreground image shown in FIG. 13, while the righthand printhead is allocated the foreground image shown in FIG. 14. (In an alternative embodiment, where for example it is desirable to minimize processing requirements, the seam defined in the foreground image may be a simple linear seam containing a set of fixed stitch points).

Figures 15, 17:
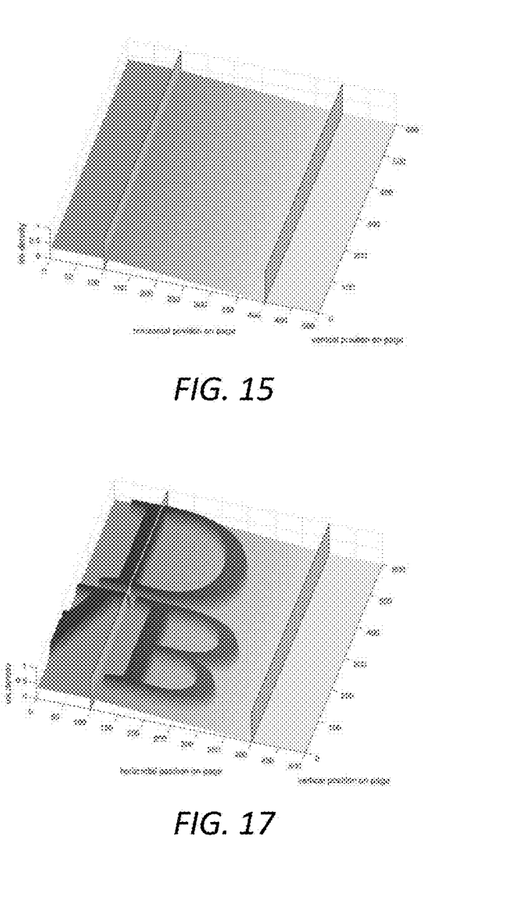
FIG. 15 is an ink density map for background image content allocated to the lefthand printhead after applying an overlap dither to the background contone image shown in FIG. 12.
FIG. 17 is an ink density map for the lefthand printhead combining the ink density maps shown in FIGS. 13 and 15.
Figures 16, 18:
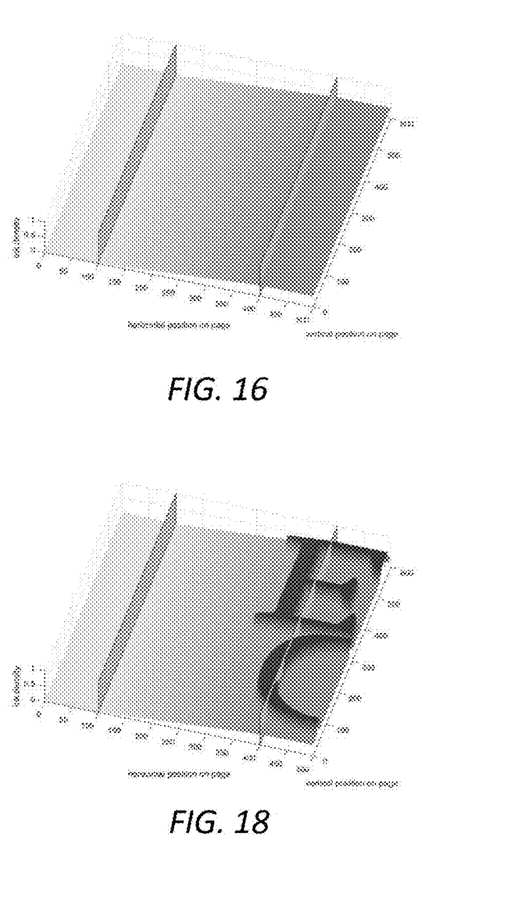
FIG. 16 is an ink density map for background image content allocated to the righthand printhead after applying an overlap dither to the background contone image shown in FIG. 12.
FIG. 18 is an ink density map for the righthand printhead combining the ink density maps shown in FIGS. 14 and 16.

Turning now to FIGS. 15 and 16, the background image is processed differently than the foreground image. Contone images are more optimally printed by feathering between the two printheads using a suitable overlap dither. Accordingly, in FIG. 15 the lefthand printhead fades printing towards the righthand printhead across the overlap region. Similarly, in FIG. 16 the righthand printhead fades printing towards the lefthand printhead across the overlap region.

The combined results for the foreground and background images are shown in FIGS. 17 and 18. In FIG. 17, the lefthand printhead is allocated all foreground text at the lefthand side of the seam, but still fades towards the righthand printhead across the overlap region for the background contone image. Likewise, in FIG. 18, the righthand printhead is allocated all foreground text at the righthand side of the seam, but still fades towards the lefthand printhead across the overlap region for the background contone image. In this way, it will be appreciated that highly optimized stitching results are achievable, regardless of any physical misalignments of the printheads and regardless of whether text and/or contone graphics are being printed.

Figure 19:
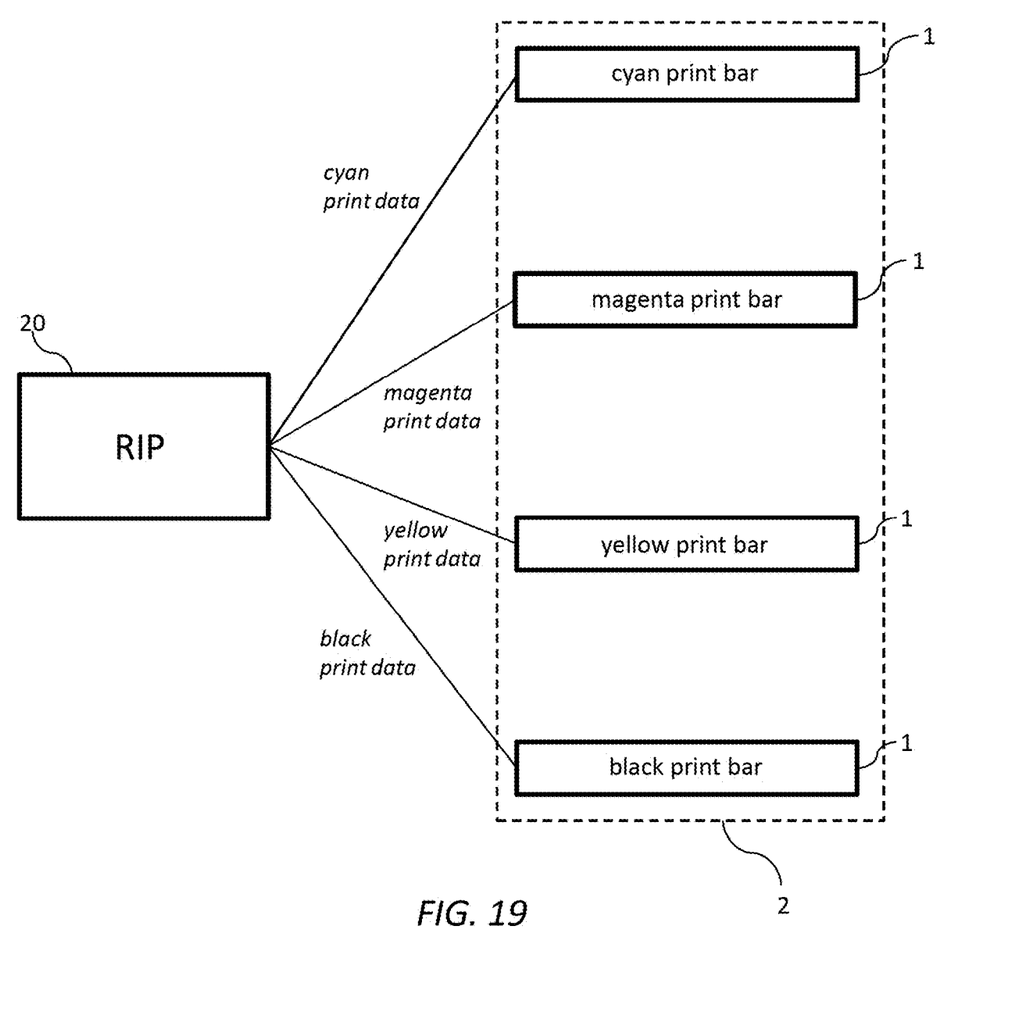
FIG. 19 shows schematically a printing system suitable for implementing the seam-carving method.

Seam carving is typically performed in image processing hardware, such as a raster image processor (RIP) upstream of a printer in an image processing pipeline. FIG. 19 shows schematically a printing system 3 having a RIP 20 delivering print data to multiple monochrome print bars 1 of a printer 2. Each of the print bars 10 shown in FIG. 19 comprises overlapping printheads 10, as shown in FIG. 1.

The RIP 20 receives image data and generates halftone bitmaps for each color channel of the printer 2, as is well known in the art. The RIP additionally performs seam carving, as described herein, to determine a stitch point for each row of print in overlap regions 12. Print data is allocated to each printhead 10 of each print bar 1 in accordance with the stitch points determined from seam carving and a suitable stitching technique (e.g. butt join, overlap dither etc). The print data generated by the RIP 20 for each color channel is supplied to the print bars 1 for printing. Typically, additional processing of the print data (e.g. dead nozzle compensation, keep-wet spitting etc) is performed before the image is printed by one or more intervening processors. Further, a supervisor controller communicates with each of the print bars 1 to control timing etc. Various image processing and printing system architectures will be well known to the person skilled in the art, and the methods described herein are not limited to any particular type of architecture.

It is an advantage of the methods described herein that the additional processing requirements of seam carving can be readily accommodated in a typical RIP, and is especially suitable for print runs involving repeated printouts of the same image. It will be appreciated that, with the growth of digital inkjet presses, the stitching techniques described herein provide a powerful tool for improving print quality without compromising print speeds.

The foregoing describes only some embodiments of the present invention, and modifications of detail may be made thereto without departing from the scope of the invention, the embodiments being illustrative and not restrictive.

The invention claimed is:

1. A method of printing an image using a printing system comprising at least first and second overlapping printhead segments, the method comprising the steps of:
   (i) identifying a strip of the image to be printed in an overlap region of the first and second printhead segments;
   (ii) determining a stitching technique for the first and second printhead segments, the stitching technique being selected from the group consisting of:
      (a) printing using only nozzles from the first printhead segment at one side of a seam and printing using only nozzles from the second printhead segment at the other side of the seam; and
      (b) printing using nozzles from both the first and second printhead segments at either side of the seam, and
   (iii) printing the image using the first and second printhead segments, the printing comprising stitching the first and second printhead segments in the overlap region using the determined stitching technique,
wherein the stitching technique is dependent on image content in the strip.

2. The method of claim 1, wherein the image content contains one or more of: text and line work, and wherein the stitching technique (a) is used for printing in the overlap region.

3. The method of claim 2, wherein the seam is a continuous seam passing through at least some of regions of relatively lower ink density.

4. The method of claim 2, further comprising the steps of:
determining a continuous seam in the strip based on a cost function, the cost function including at least one parameter selected from the group consisting of: (a) minimizing a density of printed ink along the seam; and (b) maximizing a luminance along the seam; and wherein:
the strip contains variable image content and the seam has a varying position within the strip;
the seam is determined from a row-by-row analysis of the image content contained in the strip, each row having a stitch point determined by the cost function;
the cost function includes a parameter defining a maximum threshold distance between contiguous stitch points in the strip; and
the threshold distance is 1, 2, 3, 4 or 5 horizontal pixel or dot positions between contiguous stitch points.

5. The method of claim 4, wherein the threshold distance is one horizontal pixel or dot position between contiguous stitch points.

6. The method of claim 4, wherein the cost function includes a parameter weighting the seam towards edges in the image content.

7. The method of claim 4, wherein the seam is determined using a seam carving algorithm.

8. The method of claim 1, wherein the image content contains contone graphics, and wherein the stitching technique (b) is used for printing in the overlap region.

9. The method of claim 1, further comprising the step of separating image content in the strip into a foreground image and a background image, and wherein stitching technique (a) is used for the foreground image and stitching technique (b) is used for the background image.

10. The method of claim 9, wherein stitching technique (b) employs a fade transition from the first printhead segment to the second printhead segment across the overlap region.

11. The method of claim 1, wherein the first and second printhead segments print the image using uncorrelated dithers.

12. The method of claim 1, wherein the first and second printhead segments are individual printhead chips of a printhead.

13. The method of claim 1, wherein the first and second printhead segments are individual printheads, each printhead comprising a plurality of printhead chips.

14. The method of claim 1, wherein the printer comprises one or more sets of n overlapping printhead segments, each set having n-1 overlap regions, wherein n is an integer from 2 to 50.

15. The method of claim 1, wherein the overlap region has a width in the range of 1 to 20 mm.

* * * * *